United States Patent
Huang et al.

(10) Patent No.: US 12,271,985 B2
(45) Date of Patent: Apr. 8, 2025

(54) METHOD, APPARATUS, DEVICE AND MEDIUM FOR IMAGE SPECIAL EFFECT PROCESSING

(71) Applicant: BEIJING ZITIAO NETWORK TECHNOLOGY CO., LTD., Beijing (CN)

(72) Inventors: Xiaobo Huang, Beijing (CN); Yuan Xu, Beijing (CN); Weifeng Huang, Beijing (CN); Ruifeng Ma, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 111 days.

(21) Appl. No.: 18/054,749

(22) Filed: Nov. 11, 2022

(65) Prior Publication Data

US 2023/0215065 A1     Jul. 6, 2023

(30) Foreign Application Priority Data

Dec. 30, 2021  (CN) .......................... 202111649125.3

(51) Int. Cl.
*G06T 11/60*     (2006.01)

(52) U.S. Cl.
CPC .................................... *G06T 11/60* (2013.01)

(58) Field of Classification Search
CPC .......... G06F 16/54; G06F 16/55; G06F 16/58; G06F 16/583; G06F 16/5866; G06F 16/60; G06F 16/61; G06F 16/65; G06F 3/0484; G06T 2207/10028; G06T 11/60
See application file for complete search history.

(56) References Cited

U.S. PATENT DOCUMENTS

| | | | | |
|---|---|---|---|---|
| 2009/0141024 A1* | 6/2009 | Lee | ....................... | H04N 21/816 |
| | | | | 345/420 |
| 2009/0154833 A1* | 6/2009 | Sakaue | ................ | H04N 1/2112 |
| | | | | 382/282 |
| 2020/0201693 A1* | 6/2020 | Jobi | ........................ | G06F 9/545 |

FOREIGN PATENT DOCUMENTS

| | | |
|---|---|---|
| CN | 102567000 A | 7/2012 |
| CN | 102694982 A | 9/2012 |
| CN | 110070496 A | 7/2019 |
| CN | 110070592 A | 7/2019 |
| CN | 110147231 A | 8/2019 |
| CN | 112685103 A | 4/2021 |
| CN | 113296891 A | 8/2021 |
| JP | 2012039505 A | 2/2012 |

\* cited by examiner

*Primary Examiner* — Hau H Nguyen

(57) ABSTRACT

Embodiments of the present disclosure relate to a method, apparatus, device, and medium for image special effect processing, wherein the method including: in response to a first generation request for a first target node in a main image, generating a first sub-container node connected to a main container node associated with the main image; the first generation request including a first image type corresponding to the first target node, generating a first sub-image associated with the first sub-container node based on the first image type, the first sub-image including at least one first operation node; acquiring a command for image special effect processing based on a main operation node of the main image and the first operation node of the first sub-image; and processing and displaying a target image based on the command for image special effect processing.

20 Claims, 7 Drawing Sheets

METHOD, APPARATUS, DEVICE AND MEDIUM FOR IMAGE SPECIAL EFFECT PROCESSING

CROSS-REFERENCE TO RELATED APPLICATION

The present application claims priority to P.R.C. patent application No. 202111649125.3, filed Dec. 30, 2021, and entitled "METHOD, APPARATUS, DEVICE AND MEDIUM FOR IMAGE SPECIAL EFFECT PROCESSING", the entirety of which is incorporated herein by reference.

TECHNICAL FIELD

The present disclosure relates to the field of image processing technology, and in particular, to method, apparatus, device and medium for image special effect processing.

BACKGROUND

With rapid development of Internet technology and intelligent terminals, a large number of image special effects can be provided to users so that users can process images.

SUMMARY

The present disclosure provides method, apparatus, device and medium for image special effect processing.

An embodiment of the present disclosure provides a method for image special effect processing, the method comprising: in response to a first generation request for a first target node in a main image, generating a first sub-container node connected to a main container node associated with the main image; wherein the first generation request includes a first image type corresponding to the first target node; generating a first sub-image associated with the first sub-container node based on the first image type; wherein the first sub-image includes at least one first operation node; based on a main operation node of the main image and the first operation node of the first sub-image, acquiring a command for image special effect processing; and processing and displaying a target image based on the command for image special effect processing.

An embodiment of the present disclosure further provides an apparatus for image special effect processing, the apparatus comprising: a response generation module configured to generate a first sub-container node connected to a main container node associated with a main image in response to a first generation request for a first target node in the main image; wherein the first generation request includes a first image type corresponding to the first target node; a sub-image generation module configured to generate a first sub-image associated with the first sub-container node based on the first image type; wherein the first sub-image includes at least one first operation node; an instruction acquisition module configured to acquire a command for image special effect processing based on a main operation node of the main image and the first operation node of the first sub-image; and a processing and display module configured to process and display a target image based on the command for image special effect processing.

An embodiment of the present disclosure further provides an electronic device, the electronic device comprising: a processor; and a memory for storing instructions executable by the processor; the processor is configured to read the executable instructions from the memory, and execute the instructions to implement the method for image special effect processing provided by embodiments of the present disclosure.

An embodiment of the present disclosure further provides a computer-readable storage medium having a computer program stored thereon, the computer program being used to execute the method for image special effect processing provided by embodiments of the present disclosure.

BRIEF DESCRIPTION OF THE DRAWINGS

The above and other features, advantages, and aspects of embodiments of the present disclosure will become more apparent in conjunction with the accompanying drawings and with reference to the following detailed description. Throughout the drawings, the like or similar reference signs indicate the like or similar elements. It should be understood that the drawings are schematic and the originals and elements are not necessarily drawn to scale.

DETAILED DESCRIPTION

Figure 1:
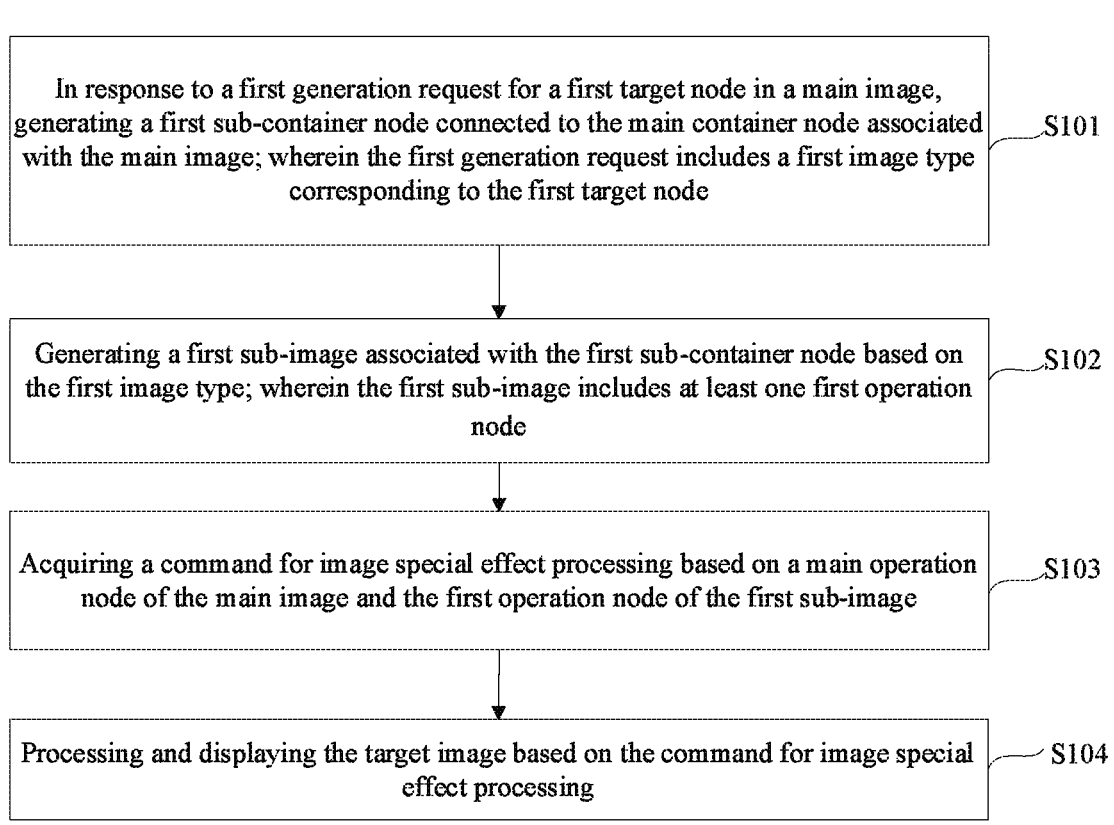
FIG. 1 is a schematic flowchart of a method for image special effect processing provided by an embodiment of the present disclosure.

Hereinafter, embodiments of the present disclosure will be described in more detail with reference to the accompanying drawings. Although some embodiments of the present disclosure are shown in the drawings, it should be understood that the present disclosure can be implemented in many different forms, which should not be construed as being limited to embodiments set forth herein, rather, these embodiments are provided for a more thorough and complete understanding of the present disclosure. It should be understood that the drawings and embodiments of the present disclosure should be explained as merely illustrative, and not as a limitation to the protection scope of the present disclosure.

It should be understood that various steps recited in the method embodiments of the present disclosure may be executed in a different order, and/or executed in parallel. In addition, the method implementations may include additional steps and/or omit to perform illustrated steps. The scope of the present disclosure is not limited in this respect.

The term "including" and its variants as used herein are open includes, that is, "including but not limited to". The term "based on" means "based at least on." The term "an embodiment" means "at least one embodiment"; the term "another embodiment" means "at least an additional embodiment"; the term "some embodiments" means "at least some embodiments." Related definitions of other terms will be given in following description.

It should be noted that the concepts of "first" and "second" etc. mentioned in the present disclosure are only used to distinguish between different apparatus, modules or units, and are not used to limit the order of functions performed by these apparatus, modules or units or their interdependence.

It should be noted that modifiers of "a/an" and "a plurality of" mentioned in the present disclosure are illustrative and not restrictive, and those skilled in the art should understand that they should be construed as "one or more" unless the context clearly indicates otherwise.

The names of messages or information interacted between a plurality of apparatus in embodiments of the present disclosure are only used for illustration, and are not used to limit the scope of these messages or information.

In related arts, the number of operation nodes for special effect in a main image is reduced by way of generating sub-images, thus improving rendering quality. However, although sub-images can be created in a main image, if the main image is one script type, the created sub-images may only be one script type, resulting in a relatively monotonous processing approach for image special effects.

FIG. 1 is a schematic flowchart of a method for image special effect processing provided by an embodiment of the present disclosure. The method may be executed by an apparatus for image special effect processing, wherein the apparatus may be implemented by software and/or hardware, and may generally be integrated in an electronic device. As shown in FIG. 1, the method comprises the following steps.

Step 101: in response to a first generation request for a first target node in a main image, generating a first sub-container node connected to a main container node associated with the main image; wherein the first generation request includes a first image type corresponding to the first target node.

Wherein, only one main image and one main container node associated with the main image are included in one image special effect processing process. The main image refers to an image structure including at least one main operation node. In general, when opening an image editing software, a system creates one main container node and one main image by default, and associates the main container node with the main image, specifically, stores a main image identifier corresponding to the main image in attribute information of the main container node; wherein the main image identifier can uniquely identify one main image.

Wherein, the first target node can be understood as an operation node displayed in the main image. In an embodiment of the present disclosure, the first image type can be understood as an image type corresponding to the first target node, such as script image, audio image, coloring image, material image, etc., and the image type corresponding to the first target node in the main image is different from the image type corresponding to the main image. The container node refers to a container component that builds an image map structure as one node. In an embodiment of the present disclosure, for a data structure with a hierarchical relationship between individual container nodes, an inverted tree is often used to represent the logical relationship, and it is the main container node to be the topmost node of the tree. The first container node refers to child nodes connected to the main container node, and the main container node can be connected to one or more first container nodes.

In an embodiment of the present disclosure, in response to the first generation request for the first target node in the main image, generating the first sub-container node connected to the main container node includes: generating the first generation request based on a trigger operation by a user on the first target node displayed in the main image in an image special effect processing page, and generating the first sub-container node connected to the main container node in response to the first generation request. Wherein, the image special effect processing page refers to a page for performing special effect processing on a target image.

Specifically, in the process for image special effect processing, a trigger operation by a user on an image special effect processing page can be detected, and when an operation such as click, hover, etc. by the user on the first target node is detected, a first sub-container node connected to the main container node is generated in respond to the first generation request for the first target node in the main image.

Step 102: generating a first sub-image associated with the first sub-container node based on the first image type; wherein the first sub-image includes at least one first operation node.

Wherein, the first sub-image refers to an image structure including at least one first operation node. In some implementations, a first operation node corresponding to the first image type is acquired, and the first sub-image is generated based on the first operation node, and an first image identifier corresponding to the first sub-image is stored in attribute information of the first sub-container node; the operation node refers to a control node that determines a special effect corresponding to an image, and the first operation node refers to a control node that determines a special effect corresponding to a first sub-image, and a sub-image generated by the combination of at least one first operation node can realize one special effect, for example, it can control mouth opening of a target object in a target image.

In an embodiment of the present disclosure, after the first sub-container node connected to the main container node is generated, the first sub-image associated with the first sub-container node can be generated based on the first image type.

Step 103: acquiring a command for image special effect processing based on a main operation node of the main image and the first operation node of the first sub-image.

Step 104, processing and displaying the target image based on the command for image special effect processing.

In an embodiment of the present disclosure, a first sub-container node connected to a main container node is generated, which represents the connection relationship between the main container node and the first sub-container node, thereby representing the connection relationship between the main image and the first sub-image. The main image includes one or more main operation nodes and the connection relationship between the main operation nodes. Similarly, the first sub-image includes one or more first operation nodes and the connection relationship between the first operation nodes; therefore, the command for image special effect processing is acquired based on the main operation nodes of the main image and the first operation nodes of the first sub-image.

Wherein, the target image may be a captured image or an image frame in a video, such as a video scene, and any image frame in the video is acquired as the target image. Specifically, after the command for image special effect processing is acquired, the target image can be processed and displayed based on the command for image special effect processing, so that the user can watch display effect of a special effect corresponding to the video in the process of watching the video.

It should be noted that the number of the first sub-image may be more than one, and when an instruction for image special effect operation is generated, the execution order of the instruction for image special effect operation may be determined according to creation times of the first sub-images.

In the image special effect processing solution provided by an embodiment of the present disclosure, in response to a first generation request for a first target node in a main image, a first sub-container node connected to a main container node associated with the main image is generated, wherein the first generation request includes a first image type corresponding to the first target node; a first sub-image associated with the first sub-container node is generated based on the first image type, wherein the first sub-image includes at least one first operation node; based on a main operation node of the main image and the first operation node of the first sub-image, a command for image special effect processing is acquired; and a target image is processed and displayed based on the command for image special effect processing. By using above technical solutions, in the process for image special effect processing, different types of sub-images can be generated based on triggering of target nodes in a main image, thereby enriching the diversity of image special effect processing, allowing users to create more rich images, and further improving display effects of image special effects in image special effect processing scenarios.

In some embodiments, a creation request including a first image type is received; a target container node connected to a main container node is generated; and a target sub-image including a first target node is generated based on the first image type, wherein the first target node is a null operation node; connections between a target node and any main operation node in the main image are established, and a target image identifier corresponding to the target sub-image is stored in attribute information of the target sub-container node.

In an embodiment of the present disclosure, in order to ensure that a sub-image of a different type from the main image can be generated, a first target node of an image type different from the main image needs to be created in the main image and displayed in the main image. Specifically, a creation request is sent based on a trigger operation by a user on an image special effect processing page, and a target container node connected to the main container node is generated in response to the creation request.

Wherein, the target container node refers to a child node connected to the main container node. The first image type can be understood as an image type corresponding to the first target node, such as script image, audio image, coloring image, material image, and the like.

In an embodiment of the present disclosure, the first target node is a null node, that is, a control node that does not determine special effects; a target sub-image including the first target node is generated; and connections between the first target node and any main operation node in the main image are established, and a target image identifier corresponding to the target sub-image is stored in attribute information of the target sub-container node, so that displaying the first target node in the main image is realized, and generating different types of sub-images based on triggering of the first target node is realized.

In above solution, a first target node of a different image type is generated in the main image, thereby realizing that different types of sub-images can be generated based on the triggering of the first target node in the process of image special effect processing, so that the way for image special effect processing is more flexible, further improving effects of displaying image special effects, and thus improving user experience effects.

It should be noted that, in general, when opening an image editing software, a system creates one main container node and one main image by default. Main operation nodes included in the main image may be selected and updated according to application needs. Therefore, when an update request for the main operation nodes in the main image is received, for example, the update request is to add one main operation node, the main operation node to be added and the target main operation node can be acquired, and the main operation node to be added is added behind the target operation node. For another example, the update request is to replace one main operation node. The main operation node to be replaced and the target main operation node can be acquired, and the main operation node to be replaced is replaced with the target main operation node, and so on.

As a result, commands for image special effect processing are further enriched, so that more abundant creation can be done on images, which improves further display effects of image special effects in image special effect processing scenarios.

In some embodiments, the method for image special effect processing may further comprise: in response to a second generation request for a second target node in a first sub-image, generating a second sub-container node connected to a first container node; wherein the second generation request includes a second image type corresponding to the second target node; generating a second sub-image associated with the second sub-container node based on the second image type; wherein the second sub-image includes at least one second operation node; based on a main operation node of the main image and a first operation node of the first sub-image, acquiring a command for image special effect processing, including: based on the main operation node of the main image, the first operation node of the first sub-image and a second operation node of the second sub-image, acquiring the command for image special effect processing.

In an embodiment of the present disclosure, the main container node may be connected to one or more first container nodes, and the first sub-container nodes may also be connected to one or more second sub-container nodes, where the second container nodes refer to child nodes connected to the first container nodes.

Wherein, the second target node in the first sub-image can be understood as an operation node displayed in the first sub-image. In an embodiment of the present disclosure, the second image type can be understood as an image type corresponding to the second target node, such as script image, audio image, coloring image, etc., and the image type corresponding to the second target node in the first sub-image is different from the image type corresponding to the first sub-image.

In an embodiment of the present disclosure, in response to a second generation request for a second target node in a first sub-image, generating a second sub-container node connected to a first container node includes: generating the second generation request based on a trigger operation by a user on the second target node displayed in the first sub-image on an image special effect processing page, generating a second sub-container node connected to the first container node in response to the second generation request.

It should be noted that the generation method of the second target node in the first sub-image is the same as the generation method of the first target node in the main image. Refer to the foregoing detailed description for the first target node in the main image, which will not be repeated in detail here.

In an embodiment of the present disclosure, after the second sub-container node connected to the first container node is generated, a second sub-image associated with the second sub-container node may be generated based on the second image type, where the second sub-image refers to an image structure including at least one operation node. In some implementations, a second operation node corresponding to the second image type is acquired, the second sub-image is generated based on the second operation node, and a second image identifier corresponding to the second sub-image is stored in attribute information of the second sub-container node.

In an embodiment of the present disclosure, the connection relationship between the main container node and the first sub-container node thus represents the connection relationship between the main image and the first sub-image, and the connection relationship between the first container node and the second sub-container node thus represents the connection relationship between the first sub-image and the second sub-image. The main image includes at least one main operation node and the connection relationship between the main operation nodes. Similarly, the first sub-image includes at least one first operation node and the connection relationship between the first operation nodes, and the second sub-image includes at least one second operation node and the connection relationship between the second operation nodes, so that based on the main operation nodes of the main image, the first operation nodes of the first sub-image and the second operation nodes of the second sub-image, the command for image effect processing is acquired.

Specifically, after acquiring the command for image special effect processing, the target image can be processed and displayed based on the command for image special effect processing.

In above solution, a second target node of a different image type is displayed in the first sub-image, thereby realizing that different types of sub-images can be generated based on the triggering of the second target node in the first sub-image in the process of image special effect processing, further improving effects of displaying image special effects, and thus improving user experience effects.

In some embodiments, a connection relationship between at least one first operation node corresponding to the first image type and the first operation node is acquired; based on the connection relationship between the at least one first operation node and the first operation node, a first sub-image is generated; and a first image identifier corresponding to the first sub-image is stored in attribute information of the first sub-container node.

Wherein, the operation node refers to a control node that determines a special effect corresponding to the sub-image, the first operation node refers to a control node that determines a special effect corresponding to a first sub-image, and a sub-image generated by the combination of at least one first operation node can realize one special effect, for example, it can control mouth opening of a target object in a target image. Operation nodes corresponding to different image types are different, and the connection relationship between at least one first operation node corresponding to the first image type and the first operation node is acquired, for example, the first image type is script image; the first operation nodes are acquired, for example, A, B, and C, and the connection relationship between the operation nodes is that A is connected to B, and B is connected to C, so as to generate a sub-image in which the first operation node A is connected to the first operation node B, and the operation node B is connected to the first operation node C.

In an embodiment of the present disclosure, the first image identifier corresponding to the first sub-image is stored in attribute information of the first sub-container node, so that the connection relation between corresponding images can be acquired based on the connection relation between the container nodes.

In above solution, sub-images including different operation nodes can be generated, which further improves effects of displaying image special effects, thereby improving user experience effects.

In some embodiments, acquiring a command for image special effect processing based on main operation nodes of a main image and first operation nodes of a first sub-image includes: acquiring relationship information between the main operation nodes based on the main image; acquiring relationship information between the first operation nodes based on the first sub-image; and generating a command for image special effect processing based on the main operation nodes, the relationship information between the main operation nodes, the first operation nodes and the relationship information between the first operation nodes.

Specifically, based on connection relationship information between the main container nodes and the first sub-container nodes, the connection relationship between the main image and the first sub-image can be determined, and based on the main image, the main operation nodes and relationship information between the main operation nodes are acquired, and based on the first sub-image, the first operation nodes and relationship information between the first operation nodes are acquired, so as to the command for image special effect processing is determined. For example, based on the main image, the main operation nodes such as D, E and F are acquired, and the connection relationship between the operation nodes is that D is connected to E, and E is connected to F, and based on the first sub-image, the first operation nodes such as A, B, and C are acquired, and the connection relationship between the operation nodes is that A is connected to B, B is connected to C, and the main image is connected to the first sub-image. Thus, the connection sequence D-E-F-A-B-C of the operation nodes is determined, thereby acquiring the command for image special effect processing corresponding to D-E-F-A-B-C.

In above solution, the command for image special effect processing can be quickly acquired, so that the image special effect processing is smoother, which further improves display effects of image special effects.

In some embodiments, in response to a transfer request, a container node to be transferred and a container node to be connected are acquired; the container node to be transferred is disconnected from the original container node; and a connection between the container node to be transferred and the container node to be connected is established.

In an embodiment of the present disclosure, a transfer request is generated based on a selection trigger operation by a user on a sub-image in an image special effect processing page, and in response to the transfer request, a container node to be transferred and a container node to be connected are acquired, wherein the container node to be transferred may be a child node connected to the main container node, or a child node connected to the sub-container node. The container node to be connected can be one of the main container node, the child node connected to the main container node, and the child node connected to the sub-container node.

Specifically, after acquiring the container node to be transferred and the container node to be connected, the container node to be transferred is disconnected from the original container node; connection between the container node to be transferred and the container node to be connected is established; and the transfer of image direct connection relationships can be realized based on the transfer of the connections of the container nodes.

In above solution, the sequence of special effects operations corresponding to any sub-image can be replaced to further meet user's requirements for special effect processing and improve user experiences.

In some embodiments, in response to a deletion request, a container node to be deleted is acquired; an identifier of an image to be deleted is acquired based on attribute information in the container node to be deleted; the image to be deleted is acquired based on the identifier of the image to be deleted; the container node to be deleted and the image to be deleted are deleted; and in the case that an upper-level container node and a lower-level container node corresponding to the container node to be deleted are acquired, a connection between the upper-level container node and the lower-level container node is established.

In an embodiment of the present disclosure, the container node to be deleted may be a child node connected to the main container node, or may be a child node connected to the sub-container node.

In an embodiment of the present disclosure, attribute information of each container node stores an associated image identifier that can identify one image uniquely, which here usually refers to a sub-image identifier. Therefore, after acquiring the container node to be deleted, the identifier of the image to be deleted is acquired based on the attribute information in the container node to be deleted, so as to acquire the image to be deleted, and the image to be deleted can be directly deleted. And when the container node to be deleted is deleted, in the case that an up-level container node and a lower-level container node are acquired, a connection between the upper-level container node and the lower-level container node is established.

In above solution, relevant special effects can be removed by deleting the container nodes and corresponding images according to the needs of application scenarios, so as to further meet the needs of users and improve user experiences.

Figure 2:
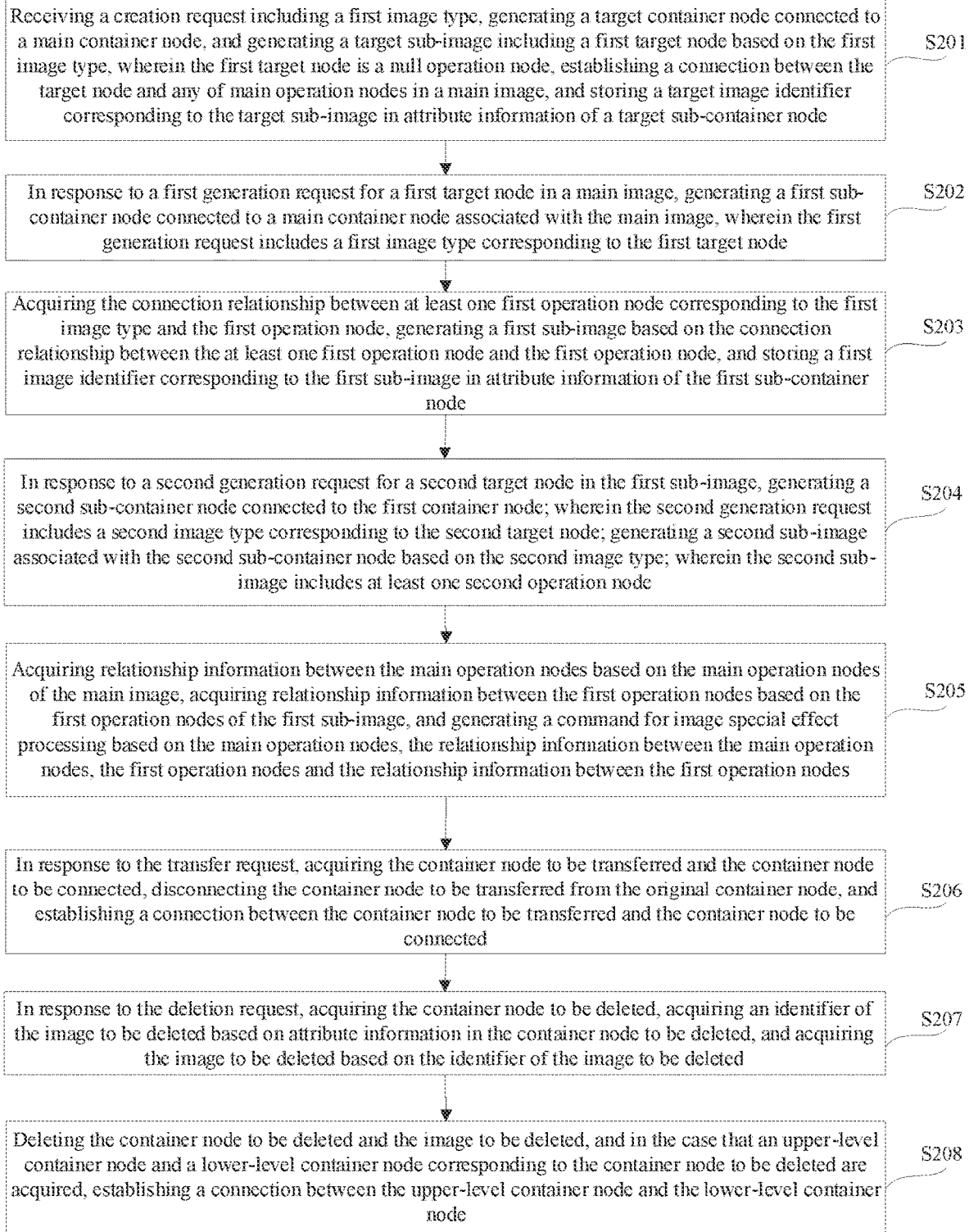
FIG. 2 is a schematic flowchart of another method for image special effect processing provided by an embodiment of the present disclosure.

FIG. 2 is a schematic flowchart of another method for image special effect processing provided by an embodiment of the present disclosure. This embodiment further optimizes above method for image special effect processing on the basis of above embodiments. As shown in FIG. 2, the method comprises the following steps.

Step 201: receiving a creation request including a first image type, generating a target container node connected to a main container node, and generating a target sub-image including a first target node based on the first image type, wherein the first target node is a null operation node, establishing a connection between the target node and any of main operation nodes in a main image, and storing a target image identifier corresponding to the target sub-image in attribute information of a target sub-container node.

Figure 3A:
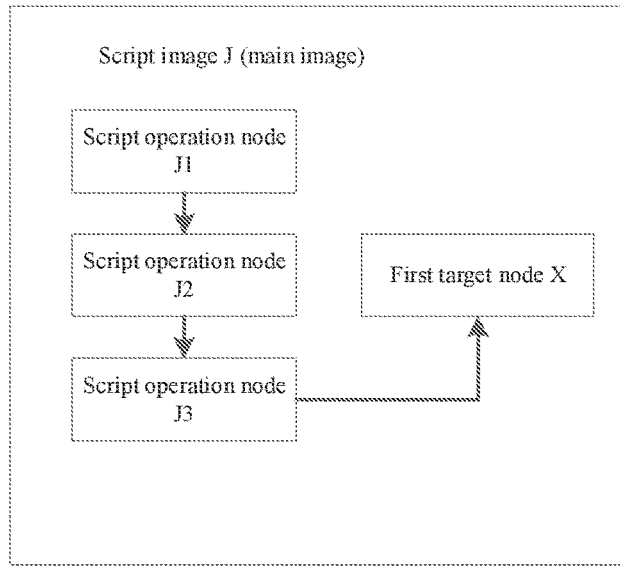
FIG. 3a is a schematic diagram of an image special effect processing interface provided by an embodiment of the present disclosure.

Exemplarily, FIG. 3a is a schematic diagram of an image special effect processing interface provided by an embodiment of the present disclosure. The figure shows a schematic diagram of an image special effect processing page. The image special effect processing page includes a main image, of which the image type is script image J, which can only script related operation nodes can be generated, for example, including script operation node J1, script operation node J2, script operation node J3, and a generated first target node X. Wherein, the main image J generated by the combination of the script operation node J1, the script operation node J2 and the script operation node J3 can realize one special effect. The first target node X is a null operation node with a different image type from the main image, and is connected to the script operation node J3 in the main image.

Step 202: in response to a first generation request for a first target node in a main image, generating a first sub-container node connected to a main container node associated with the main image, wherein the first generation request includes a first image type corresponding to the first target node.

Step 203: acquiring the connection relationship between at least one first operation node corresponding to the first image type and the first operation node, generating a first sub-image based on the connection relationship between the at least one first operation node and the first operation node, and storing a first image identifier corresponding to the first sub-image in attribute information of the first sub-container node.

Figure 4A:
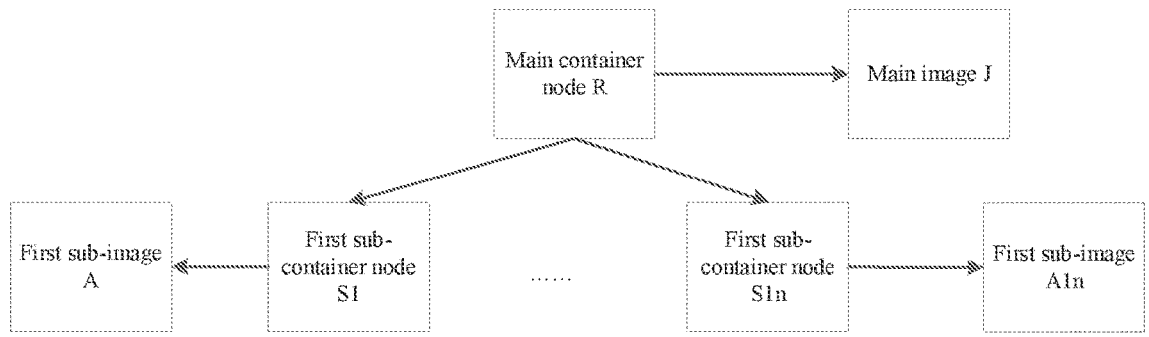
FIG. 4a is a schematic diagram of a container node connection provided by an embodiment of the present disclosure.

Exemplarily, taking the main image in FIG. 3a as an example, if a generation request is sent based on the script operation node J1, the script operation node J2 and the script operation node J3, the generated sub-image is still a script image. In order to further improve the diversity of creation, the first generation request can be generated by clicking etc. on the first target node X in FIG. 3a, thereby generating a first sub-container node connected to a main container node associated with the main image. As shown in FIG. 4a, the main container node R is connected to the first sub-container node S1, and the main container node R is associated with the main image J, and the first sub-container node S1 is associated with the first sub-image A.

In FIG. 4a, other first sub-container nodes S1n that are in a parallel relationship with the first sub-container node S1 are also shown, that is, one or more first sub-container nodes can be generated according to the needs of application scenarios.

Figure 3B:
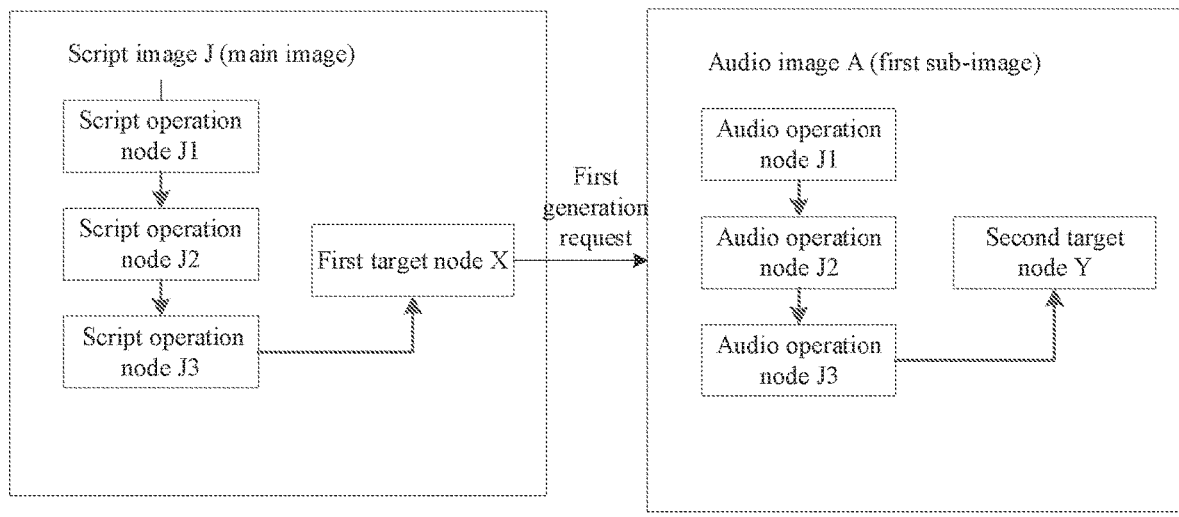
FIG. 3b is a schematic diagram of another image special effect processing interface provided by an embodiment of the present disclosure.

It can be understood that the first generation request generated based on the first target node includes the first image type corresponding to the first target node, that is to say, the image type of the generated first sub-image is same as the first image type corresponding to the first target node. For example, the first image type corresponding to the first target node is audio image A, and only audio-related operation nodes can be generated, for example, including audio operation node A1, audio operation node A2 and audio operation node A3. As shown in FIG. 3b, the first sub-image A generated by the combination of the audio operation node A1, the audio operation node A2 and the audio operation node A3 can realize one special effect, for example singing.

In addition, in order to further improve the possibility of material creation, a second target node may be generated in the first sub-image in the manner of processing of step 201, as shown in FIG. 3b, and the generated second target node Y. Wherein, the second target node Y is a null operation node with a different image type from that of the first sub-image, and is connected to the audio operation node A3 in the first sub-image.

Step 204: in response to a second generation request for a second target node in the first sub-image, generating a second sub-container node connected to the first container node; wherein the second generation request includes a second image type corresponding to the second target node; generating a second sub-image associated with the second sub-container node based on the second image type; wherein the second sub-image includes at least one second operation node.

Figure 4B:
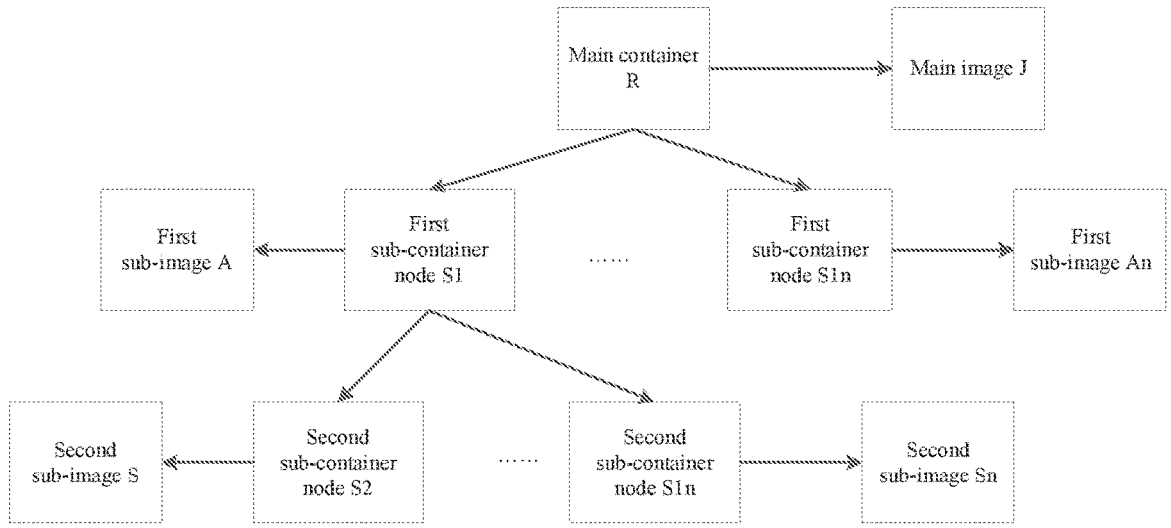
FIG. 4b is a schematic diagram of another container node connection provided by an embodiment of the present disclosure.

Exemplarily, taking the first sub-image in FIG. 3b as an example, if a generation request is sent based on the audio operation node A1, the audio operation node A2 and the audio operation node A3, the generated second sub-image is still an audio image. In order to further improve the diversity of the creation, the second generation request can be generated by clicking etc. on the second target node Y in FIG. 3b, thereby generating a second sub-container node connected to a first sub-container node associated with the first sub-image. As shown in FIG. 4b, the main container node R is connected to the first sub-container node S1, and the main container node R is associated with the main image J, and the first sub-container node S1 is associated with the first sub-image A. The first container node S1 is connected to the sub-container node S2, and the second container node S2 is associated with the second sub-image S.

In FIG. 4b, other first sub-container nodes S2n that are in a parallel relationship with the second sub-container node S2 are also shown, that is, one or more second sub-container nodes can be generated according to the needs of application scenarios.

It can be understood that the second generation request generated based on the second target node includes the second image type corresponding to the second target node, that is to say, the image type of the generated second sub-image is the same as the first image type corresponding to the second target node. For example, the second image type corresponding to the second target node is a coloring image S, and only coloring-related operation nodes can be generated, for example, including coloring operation node S1, coloring operation node S2 and coloring operation node S3, as shown in FIG. 3c.

Figure 3C:
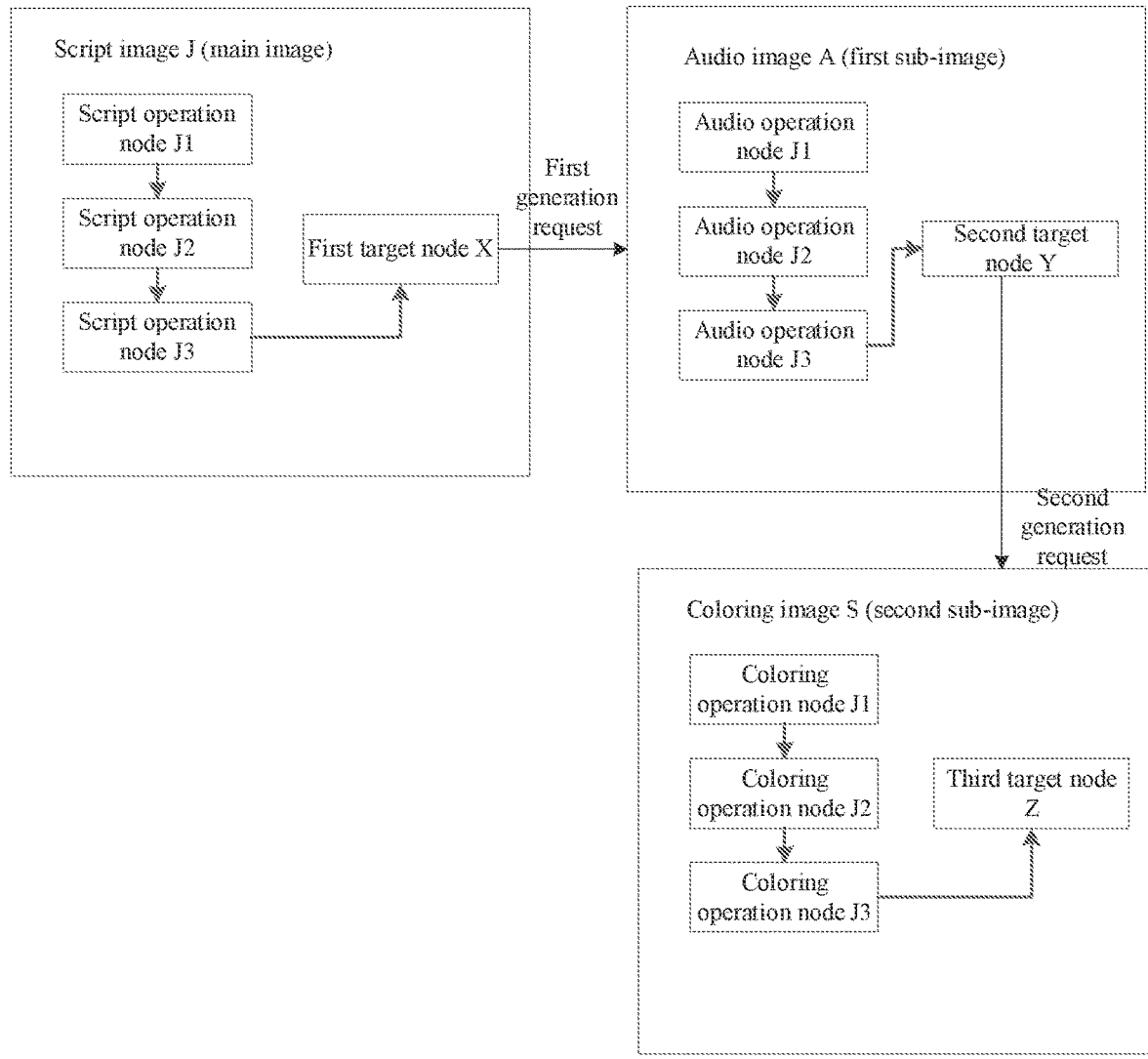
FIG. 3c is a schematic diagram of yet another image special effect processing interface provided by an embodiment of the present disclosure.

In addition, in order to further improve the possibility of material creation, a third target node may be generated in the second sub-image in the manner of processing of step 201, as shown in FIG. 3c, and the generated third target node Z. Wherein, the third target node Z is a null operation node with a different image type from that of the second sub-image, and is connected to the coloring operation node S3 in the second sub-image.

Step 205: acquiring relationship information between the main operation nodes based on the main operation nodes of the main image, acquiring relationship information between the first operation nodes based on the first operation nodes of the first sub-image, and generating a command for image special effect processing based on the main operation nodes, the relationship information between the main operation nodes, the first operation nodes and the relationship information between the first operation nodes.

After step 205, step 206 and/or step 207-step 208 can be executed, and the specific execution sequence shown in FIG. 2 is only an example.

Exemplarily, based on the main operation nodes of the main image shown in FIG. 3a, the connection relationship between the script operation node J1, the script operation node J2 and the script operation node J3 can be acquired, and based on the first operation nodes of the first sub-image shown in FIG. 3b, the connection relationship between the audio operation node A1, the audio operation node A2 and the audio operation node A3 can be acquired, and based on the connection relationship between the main container nodes and the first sub-container nodes, the connection relationship between the main image and the first sub-image can be determined, and finally, the execution sequence of the command for image special effect processing is determined to execute the script operation node J1, the script operation node J2, the script operation node J3, the audio operation node A1, the audio operation node A2 and the audio operation node A3.

Step 206, in response to the transfer request, acquiring the container node to be transferred and the container node to be connected, disconnecting the container node to be transferred from the original container node, and establishing a connection between the container node to be transferred and the container node to be connected.

Figure 4C:
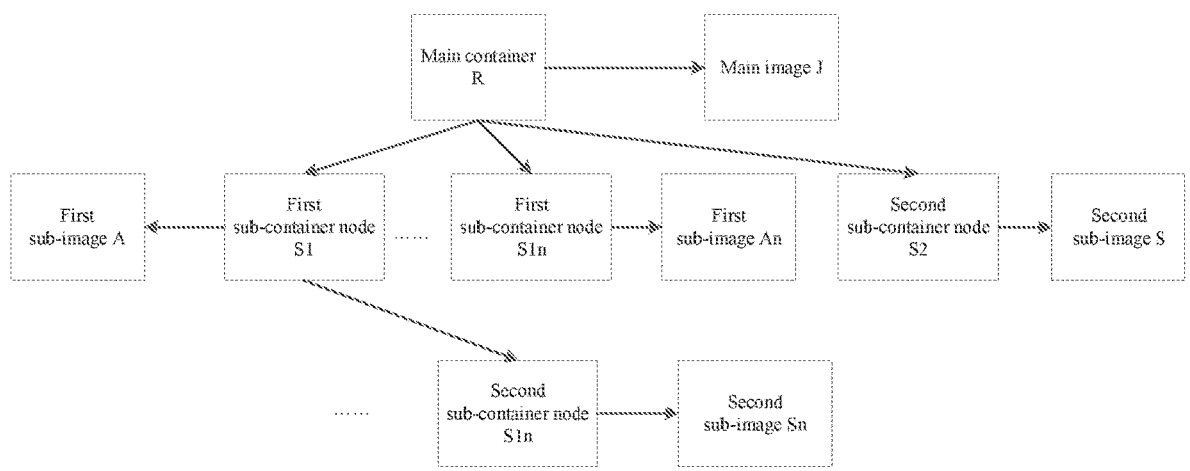
FIG. 4c is a schematic diagram of yet another container node connection provided by an embodiment of the present disclosure.

Exemplarily, taking FIG. 4b as an example, the container node to be transferred is the second container node S2, the container node to be connected is the main container node R, and the second container node S2 is disconnected from the original container node (the first sub-container node S1), and a connection between the second container node S2 and the main container node R is established, as shown in FIG. 4c.

Step 207, in response to the deletion request, acquiring the container node to be deleted, acquiring an identifier of the image to be deleted based on attribute information in the container node to be deleted, and acquiring the image to be deleted based on the identifier of the image to be deleted.

Step 208: deleting the container node to be deleted and the image to be deleted, and in the case that an upper-level container node and a lower-level container node corresponding to the container node to be deleted are acquired, establishing a connection between the upper-level container node and the lower-level container node.

In an embodiment of the present disclosure, attribute information of each container node stores an associated image identifier that can identify one image uniquely, which here usually refers to a sub-image identifier. Therefore, after acquiring the container node to be deleted, the identifier of the image to be deleted is acquired based on the attribute information in the container node to be deleted, so as to acquire the image to be deleted, and the image to be deleted can be directly deleted. And when the container node to be deleted is deleted, in the case that an up-level container node and a lower-level container node are acquired, a connection between the upper-level container node and the lower-level container node is established.

Figure 4D:
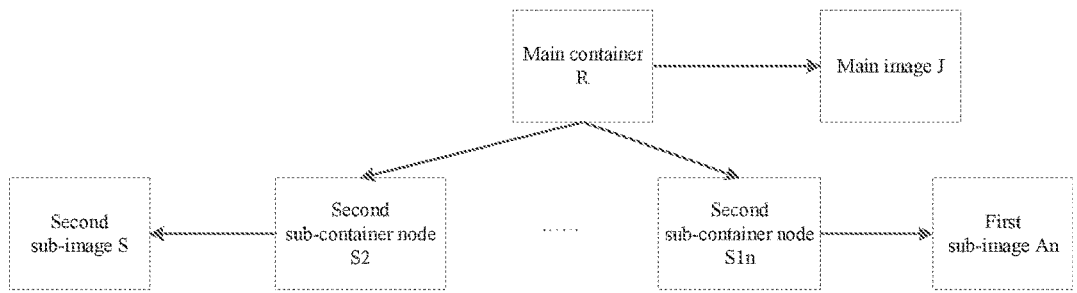
FIG. 4d is a schematic diagram of yet another container node connection provided by a further embodiment of the present disclosure.

Exemplarily, taking FIG. 4b as an example, the container node to be deleted is the first sub-container node S1, the image to be deleted is the first sub-image A, the first sub-container node S1 and the first sub-image A are deleted, and in the case that the acquired upper-level container node corresponding to the first sub-container node S1 is the main container node R and the acquired lower-level container node is the second container node S2, the connection between the main container node R and the second container node S2 is established, as shown in FIG. 4d.

In the image special effect processing solution provided by an embodiment of the present disclosure, in the process of image special effect processing, different types of sub-images can be generated based on the triggering of target nodes in a main image, and different types of next-level sub-images can be generated based on the triggering of target nodes in the sub-images, thereby enriching the diversity of image special effect processing, allowing users to create more rich images, and further improving display effects of image special effects in image special effect processing scenarios.

Figure 5:
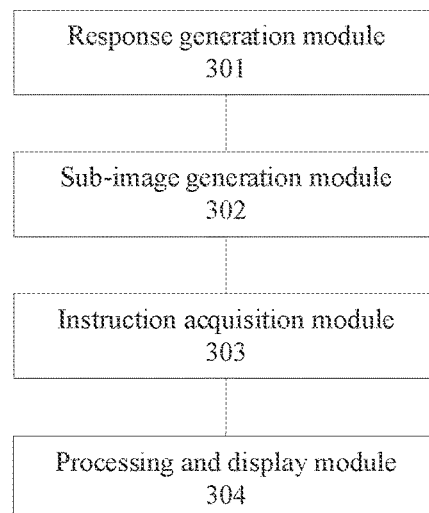
FIG. 5 is a schematic structural diagram of an apparatus for image special effect processing provided by an embodiment of the present disclosure.

FIG. 5 is a schematic structural diagram of an apparatus for image special effect processing provided by an embodiment of the present disclosure. The apparatus may be implemented by software and/or hardware, and may generally be integrated in an electronic device. As shown in FIG. 5, the device comprises: a response generation module 301 configured to generate a first sub-container node connected to a main container node associated with a main image in response to a first generation request for a first target node in the main image; wherein the first generation request includes a first image type corresponding to the first target node; a sub-image generation module 302 configured to generate a first sub-image associated with the first sub-container node based on the first image type; wherein the first sub-image includes at least one first operation node; an instruction acquisition module 303 configured to acquire a command for image special effect processing based on a main operation node of the main image and the first operation node of the first sub-image; and a processing and display module 304 configured to process and display a target image based on the command for image special effect processing.

Optionally, the apparatus further comprises: a receiving and generation module configured to receive a creation request including the first image type, and generate a target container node connected to the main container node; a first generation module configured to generate a target sub-image including the first target node based on the first image type; wherein the first target node is a null operation node; and a storage establishment module configured to establish a connection between the target node and any of the main operation nodes in the main image, and store a target image identifier corresponding to the target sub-image in attribute information of the target sub-container node.

Optionally, the response generation module 301 is further configured to generate a second sub-container node connected to the first container node in response to a second generation request for a second target node in the first sub-image; wherein the second generation request includes a second image type corresponding to the second target node; the sub-image generation module 302 is further configured to generate a second sub-image associated with the second sub-container node based on the second image type; wherein the second sub-image includes at least one second operation node; the instruction acquisition module 303 is further configured to acquire the command for image special effect processing based on the main operation node of the main image, the first operation node of the first sub-image, and the second operation node of the second sub-image.

Optionally, the sub-image generation module 302 is specifically configured to: acquire a connection relationship between at least one first operation node corresponding to the first image type and the first operation node; generate the first sub-image based on the connection relationship between the at least one first operation node and the first operation node; and store the first image identifier corresponding to the first sub-image in attribute information of the first sub-container node.

Optionally, the instruction acquisition module 303 is specifically configured to: acquire relationship information between the main operation nodes based on the main image; acquire relationship information between the first operation nodes based on the first sub-image; generate the command for image special effect processing based on the main operation nodes, the relationship information between the main operation nodes, the first operation nodes and the relationship information between the first operation nodes.

Optionally, the apparatus further comprises: a first response and acquiring module configured to acquire a container node to be transferred and a container node to be connected in response to a transfer request; a disconnection module configured to disconnect the container node to be transferred from the original container node; a container node connection module configured to establish a connection between the container node to be transferred and the container node to be connected.

Optionally, the apparatus further comprises: a second response and acquiring module configured to acquire a container node to be deleted in response to a deletion request; an image identifier acquisition module configured to acquire an identifier of the image to be deleted based on the attribute information in the container node to be deleted; an image acquisition module configured to acquire the image to be deleted based on the identifier of the image to be deleted; and a processing module configured to delete the container node to be deleted and the image to be deleted, and in the case that an up-level container node and a lower-level container node corresponding to the contain node to be deleted are acquired, establish a connection between the upper-level container node and the lower-level container node.

The apparatus for image special effect processing provided by embodiments of the present disclosure may execute the method for image special effect processing provided by any embodiment of the present disclosure, and has functional modules corresponding to the executed methods and beneficial effects.

An embodiment of the present disclosure also provides a computer program product, including a computer program/instruction, which, when executed by a processor, implements the method for image special effect processing provided by any embodiment of the present disclosure.

Figure 6:
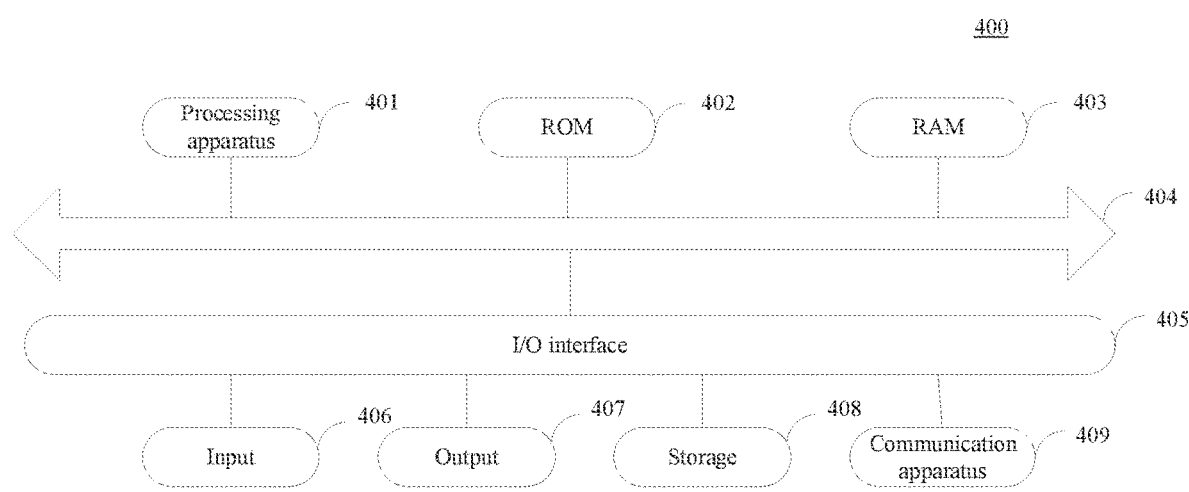
FIG. 6 is a schematic structural diagram of an electronic device provided by an embodiment of the present disclosure.

FIG. 6 is a schematic structural diagram of an electronic device provided by an embodiment of the disclosure. Referring specifically to FIG. 6 below, it shows a schematic structural diagram suitable for implementing an electronic device 400 in an embodiment of the present disclosure. The electronic device 400 in embodiments of the present disclosure may include but not limited to a mobile terminal such as a mobile phone, a notebook, a digital broadcast receiver, a PDA (Personal Digital Assistant), a PAD (tablet), a PMP (Portable Multimedia Player), a vehicle-mounted terminal (for example, a vehicle-mounted navigation terminal), etc. and a fixed terminal such as a digital TV, a desktop computer, etc. The electronic device shown in FIG. 4 is only one example, and should not bring any limitation to functions and usage scopes of embodiments of the present disclosure.

As shown in FIG. 6, the electronic device 400 may include a processing apparatus (for example a central processing unit, a graphics processor, etc.) 401, which can executes various appropriate actions and processes according to a program stored in a read-only memory (ROM) 402 or a program loaded from a storage 408 into a random access memory (RAM) 403. In the RAM 403, various programs and data required for the operation of the electronic device 400 are also stored. The processing apparatus 401, ROM 402, and RAM 403 are connected to each other through a bus 404. An input/output (I/O) interface 405 is also connected to the bus 404.

Generally, the following apparatus can be connected to the I/O interface 405: an input 406 including for example, a touch screen, a touch pad, a keyboard, a mouse, a camera, a microphone, an accelerometer, a gyroscope, etc.; an output 407 including for example, a liquid crystal display (LCD), a speaker, a vibrator, etc.; a storage 408 including for example, a magnetic tape, a hard disk, etc.; and a communication apparatus 409. The communication apparatus 409 may allow the electronic device 400 to perform wireless or wired communication with other devices to exchange data. Although FIG. 6 shows an electronic device 400 having various apparatus, it should be understood that it is not required to implement or have all of the illustrated apparatus. It can alternatively be implemented or provided with more or fewer apparatus.

In particular, according to an embodiment of the present disclosure, the process described above with reference to the flowchart can be implemented as a computer software program. For example, an embodiment of the present disclosure includes a computer program product, which includes a computer program carried on a non-transitory computer readable medium, and the computer program contains program code for executing the method shown in the flowchart. In such an embodiment, the computer program may be downloaded and installed from the network through the communication apparatus 409, or installed from the storage 408, or installed from the ROM 402. When the computer program is executed by the processing apparatus 401, above functions defined in the methods for image special effect processing of embodiments of the present disclosure are executed.

It should be noted that above computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. More specific examples of computer-readable storage media may include, but are not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, in which a computer-readable program code is carried. This propagated data signal can take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination thereof.

In some embodiments, the client and server can communicate with any currently known or future developed network protocol such as HTTP (Hyper Text Transfer Protocol), and can interconnect with digital data communication (for example, communication network) in any form or medium. Examples of communication networks include local area networks ("LAN"), wide area networks ("WAN"), international network (for example, the Internet), and end-to-end networks (for example, ad hoc end-to-end networks), as well as any currently known or future developed networks.

The above computer-readable medium may be included in above electronic devices; or it may exist alone without being assembled into the electronic device.

The above computer-readable medium carries one or more programs, which, when executed by the electronic device, causes the electronic device to: in response to a first generation request for a first target node in a main image, generate a first sub-container node connected to a main container node associated with the main image, wherein the first generation request includes a first image type corresponding to the first target node; generate a first sub-image associated with the first sub-container node based on the first image type, wherein the first sub-image includes at least one first operation node; acquire a command for image special effect processing based on a main operation node of the main image and the first operation node of the first sub-image; and process and display a target image based on the command for image special effect processing.

The computer program code for performing the operations of the present disclosure can be written in one or more programming languages or a combination thereof. The above programming languages include but are not limited to object-oriented programming languages such as Java, Smalltalk, C++, and include conventional procedural programming languages such as "C" language or similar programming languages. The program code can be executed entirely on a user's computer, partly executed on a user's computer, executed as an independent software package, partly executed on a user's computer and partly executed on a remote computer, or entirely executed on a remote computer or server. In the case of involving a remote computer, the remote computer can be connected to a user's computer through any kind of network, including a local area network (LAN) or a wide area network (WAN), or it can be connected to an external computer (for example, connected by using Internet provided by an Internet service provider).

The flowcharts and block diagrams in the accompanying drawings illustrate possible architecture, function, and operation implementations of a system, method, and computer program product according to various embodiments of the present disclosure. In this regard, each block in a flowchart or block diagram may represent a module, program segment, or part of code, which contains one or more executable instructions for realizing specified logic functions. It should also be noted that, in some alternative implementations, functions marked in a block may also occur in a different order than the order marked in the drawings. For example, two blocks shown in succession can actually be executed substantially in parallel, and they can sometimes be executed in the reverse order, depending on functions involved. It should also be noted that each block in a block diagram and/or flowchart, and the combination of blocks in a block diagram and/or flowchart, can be implemented by a dedicated hardware-based system that performs the specified functions or operations, or it can be implemented by a combination of dedicated hardware and computer instructions.

The units involved in embodiments of the present disclosure can be implemented in software or hardware. Wherein, the name of the unit does not constitute a limitation on the unit itself under certain circumstances.

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of machine-readable storage media may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, the present disclosure provides a method for image special effect processing, comprising: in response to a first generation request for a first target node in a main image, generating a first sub-container node connected to a main container node associated with the main image; wherein the first generation request includes a first image type corresponding to the first target node; generating a first sub-image associated with the first sub-container node based on the first image type; wherein the first sub-image includes at least one first operation node; based on a main operation node of the main image and the first operation node of the first sub-image, acquiring a command for image special effect processing; processing and displaying a target image based on the command for image special effect processing.

According to one or more embodiments of the present disclosure, in the method for image special effect processing provided by the present disclosure, before the response to a first generation request for a first target node in a main image, the method further comprises: receiving a creation request including the first image type, and generating a target container node connected to the main container node; generating a target sub-image including a first target node based on the first image type; wherein the first target node is a null operation node; establishing a connection between the target node and any of main operation nodes in the main image, and storing a target image identifier corresponding to the target sub-image in attribute information of a target sub-container node.

According to one or more embodiments of the present disclosure, the method for image special effect processing provided by the present disclosure further comprises: in response to a second generation request for a second target node in the first sub-image, generating a second sub-container node connected to the first container node; wherein the second generation request includes a second image type corresponding to the second target node; generating a second sub-image associated with the second sub-container node based on the second image type; wherein the second sub-image includes at least one second operation node; acquiring a command for image special effect processing based on the main operation node of the main image and the first operation node of the first sub-image, including: and acquiring the command for image special effect processing based on the main operation node of the main image, the first operation node of the first sub-image, and the second operation node of the second sub-image.

According to one or more embodiments of the present disclosure, in the method for image special effect processing provided by the present disclosure, the generating a first sub-image associated with the first sub-container node based on the first image type comprises: acquiring a connection relationship between at least one first operation node corresponding to the first image type and the first operation node; generating the first sub-image based on the connection relationship between the at least one first operation node and the first operation node; storing a first image identifier corresponding to the first sub-image in attribute information of the first sub-container node.

According to one or more embodiments of the present disclosure, in the method for image special effect processing provided by the present disclosure, the acquiring a command for image special effect processing based on the main operation node of the main image and the first operation node of the first sub-image comprises: acquiring relationship information between the main operation nodes based on the main image; acquiring relationship information between the first operation nodes based on the first sub-image; generating the command for image special effect processing based on the main operation nodes, the relationship information between the main operation nodes, the first operation nodes and the relationship information between the first operation nodes.

According to one or more embodiments of the present disclosure, the method for image special effect processing provided by the present disclosure further comprises: in response to a transfer request, acquiring a container node to be transferred and a container node to be connected; disconnecting the container node to be transferred from the original container node; establishing a connection between the container node to be transferred and the container node to be connected.

According to one or more embodiments of the present disclosure, the method for image special effect processing provided by the present disclosure further comprises: in response to a deletion request, acquiring a container node to be deleted; acquiring an identifier of the image to be deleted based on attribute information in the container node to be deleted; acquiring the image to be deleted based on the identifier of the image to be deleted; deleting the container node to be deleted and the image to be deleted, and in the case that an upper-level container node and a lower-level container node corresponding to the container node to be deleted are acquired, establishing a connection between the upper-level container node and the lower-level container node.

According to one or more embodiments of the present disclosure, the present disclosure provides an apparatus for image special effect processing, comprising: a response generation module configured to generate a first sub-container node connected to a main container node associated with a main image in response to a first generation request for a first target node in the main image; wherein the first generation request includes a first image type corresponding to the first target node; a sub-image generation module configured to generate a first sub-image associated with the first sub-container node based on the first image type; wherein the first sub-image includes at least one first operation node; an instruction acquisition module configured to acquire a command for image special effect processing based on a main operation node of the main image and the first operation node of the first sub-image; and a processing and display module configured to process and display a target image based on the command for image special effect processing.

According to one or more embodiments of the present disclosure, in the apparatus for image special effect processing provided by the present disclosure, the apparatus further comprises: a receiving and generation module configured to receive a creation request including the first image type, and generate a target container node connected to the main container node; a first generation module configured to generate a target sub-image including the first target node based on the first image type; wherein the first target node is a null operation node; and a storage establishment module configured to establish a connection between the target node and any of the main operation nodes in the main image, and store a target image identifier corresponding to the target sub-image in attribute information of the target sub-container node.

According to one or more embodiments of the present disclosure, in the apparatus for image special effect processing provided by the present disclosure, the response generation module is further configured to generate a second sub-container node connected to the first container node in response to a second generation request for a second target node in the first sub-image; wherein the second generation request includes a second image type corresponding to the second target node.

The sub-image generation module is further configured to generate a second sub-image associated with the second sub-container node based on the second image type; wherein the second sub-image includes at least one second operation node.

The instruction acquisition module is further configured to acquire the command for image special effect processing based on the main operation node of the main image, the first operation node of the first sub-image, and the second operation node of the second sub-image.

According to one or more embodiments of the present disclosure, in the apparatus for image special effect processing provided by the present disclosure, the sub-image generation module is specifically configured to: acquire a connection relationship between at least one first operation node corresponding to the first image type and the first operation node; generate the first sub-image based on the connection relationship between the at least one first operation node and the first operation node; store the first image identifier corresponding to the first sub-image in attribute information of the first sub-container node.

According to one or more embodiments of the present disclosure, in the apparatus for image special effect processing provided by the present disclosure, the instruction acquisition module is specifically configured to: acquire relationship information between the main operation nodes based on the main image; acquire relationship information between the first operation nodes based on the first sub-image; generate the command for image special effect processing based on the main operation nodes, the relationship information between the main operation nodes, the first operation nodes and the relationship information between the first operation nodes.

According to one or more embodiments of the present disclosure, in the apparatus for image special effect processing provided by the present disclosure, the apparatus further comprises: a first response and acquiring module configured to acquire a container node to be transferred and a container node to be connected in response to a transfer request; a disconnection module configured to disconnect the container node to be transferred from the original container node; a container node connection module configured to establish a connection between the container node to be transferred and the container node to be connected.

According to one or more embodiments of the present disclosure, in the apparatus for image special effect processing provided by the present disclosure, the apparatus further comprises: a second response and acquiring module configured to acquire a container node to be deleted in response to a deletion request; an image identifier acquisition module configured to acquire an identifier of the image to be deleted based on the attribute information in the container node to be deleted; an image acquisition module configured to acquire the image to be deleted based on the identifier of the image to be deleted; and a processing module configured to delete the container node to be deleted and the image to be deleted, and in the case that an up-level container node and a lower-level container node corresponding to the contain node to be deleted are acquired, establish a connection between the upper-level container node and the lower-level container node.

According to one or more embodiments of the present disclosure, the present disclosure provides an electronic device, comprising: a processor; and a memory for storing instructions executable by the processor; the processor is configured to read the executable instructions from the memory and execute the instructions to implement any of the methods for image special effect processing provided in the present disclosure.

According to one or more embodiments of the present disclosure, the present disclosure provides a computer-readable storage medium having a computer program stored thereon, the computer program being used to execute any of the methods for image special effect processing provided by the present disclosure.

The above description is only preferred embodiments of the present disclosure and an explanation to the technical principles applied. Those skilled in the art should understand that the scope of disclosure involved in this disclosure is not limited to technical solutions formed by specific combination of above technical features, and should also cover other technical solutions formed by arbitrarily combining above technical features or equivalent features thereof without departing from above disclosed concept. For example, those technical solutions formed by exchanging of above features and technical features disclosed in the present disclosure (but not limited to) having similar functions with each other.

In addition, although various operations are depicted in a specific order, this should not be understood as requiring these operations to be performed in the specific order shown or performed in a sequential order. Under certain circumstances, multitasking and parallel processing may be advantageous. Likewise, although several specific implementation details are included in above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in a language specific to structural features and/or logical actions of the method, it should be understood that the subject matter defined in the appended claims is not necessarily limited to the specific features or actions described above. Rather, the specific features and actions described above are merely exemplary forms of implementing the claims.

What is claimed is:

1. A method for image special effect processing, comprising:
    in response to a first generation request for a first target node in a main image, generating a first sub-container node connected to a main container node associated with the main image; wherein the first generation request includes a first image type corresponding to the first target node, wherein the first target node is an operation node in the main image and the first image type corresponding to the first target node is different from an image type corresponding to the main image, and wherein each of a main container node and a sub-container node refers to a container component that builds an image map structure as a node;
    generating a first sub-image associated with the first sub-container node based on the first image type; wherein the first sub-image includes at least one first operation node;
    acquiring a command for image special effect processing based on a main operation node of the main image and the first operation node of the first sub-image, wherein the operation node in the main image refers to a control node that determines a special effect corresponding to the main image, and wherein the first operation node in the first sub-image refers to a control node that determines a special effect corresponding to the first sub-image; and
    processing and displaying a target image based on the command for image special effect processing.

2. The method for image special effect processing of claim 1, further comprising, before the response to a first generation request for a first target node in a main image:
    receiving a creation request including the first image type, and generating a target container node connected to the main container node;
    generating a target sub-image including the first target node based on the first image type; wherein the first target node is a null operation node; and
    establishing a connection between the first target node and any of main operation nodes in the main image, and storing a target image identifier corresponding to the target sub-image in attribute information of the target container node.

3. The method for image special effect processing of claim 1, further comprising:
    in response to a second generation request for a second target node in the first sub-image, generating a second sub-container node connected to the first sub-container node; wherein the second generation request includes a second image type corresponding to the second target node; and
    generating a second sub-image associated with the second sub-container node based on the second image type; wherein the second sub-image includes at least one second operation node;
    wherein the acquiring a command for image special effect processing based on the main operation node of the main image and the first operation node of the first sub-image includes:
    acquiring the command for image special effect processing based on the main operation nodes of the main image, the first operation node of the first sub-image, and the second operation node of the second sub-image.

4. The method for image special effect processing of claim 1, wherein the generating a first sub-image associated with the first sub-container node based on the first image type comprises:
    acquiring a connection relationship between at least one first operation node corresponding to the first image type and the first operation node;
    generating the first sub-image based on the connection relationship between the at least one first operation node and the first operation node; and
    storing a first image identifier corresponding to the first sub-image in attribute information of the first sub-container node.

5. The method for image special effect processing of claim 1, wherein the acquiring a command for image special effect processing based on the main operation node of the main image and the first operation node of the first sub-image comprises:
    acquiring relationship information between main operation nodes based on the main image;
    acquiring relationship information between first operation nodes based on the first sub-image; and
    generating the command for image special effect processing based on the main operation nodes, the relationship information between the main operation nodes, the first operation nodes and the relationship information between the first operation nodes.

6. The method for image special effect processing of claim 1, further comprising:
    in response to a transfer request, acquiring a container node to be transferred and a container node to be connected;
    disconnecting the container node to be transferred from the original container node; and
    establishing a connection between the container node to be transferred and the container node to be connected.

7. The method for image special effect processing of claim 1, further comprising:
    in response to a deletion request, acquiring a container node to be deleted;
    acquiring an identifier of the image to be deleted based on attribute information in the container node to be deleted;
    acquiring the image to be deleted based on the identifier of the image to be deleted;
    deleting the container node to be deleted and the image to be deleted; and in a case that an upper-level container node and a lower-level container node corresponding to the container node to be deleted are acquired, establishing a connection between the upper-level container node and the lower-level container node.

8. An electronic device, comprising:
a processor; and
a memory storing instructions executable by the processor;
the processor is configured to read the executable instructions from the memory, and execute the instructions to:
in response to a first generation request for a first target node in a main image, generate a first sub-container node connected to a main container node associated with the main image; wherein the first generation request includes a first image type corresponding to the first target node, wherein the first target node is an operation node in the main image and the first image type corresponding to the first target node is different from an image type corresponding to the main image, and wherein each of a main container node and a sub-container node refers to a container component that builds an image map structure as a node;
generate a first sub-image associated with the first sub-container node based on the first image type; wherein the first sub-image includes at least one first operation node;
acquire a command for image special effect processing based on a main operation node of the main image and the first operation node of the first sub-image, wherein the operation node in the main image refers to a control node that determines a special effect corresponding to the main image, and wherein the first operation node in the first sub-image refers to a control node that determines a special effect corresponding to the first sub-image; and
process and display a target image based on the command for image special effect processing.

9. The electronic device of claim 8, wherein the processor is further configured to, before the response to a first generation request for a first target node in a main image:
receive a creation request including the first image type, and generating a target container node connected to the main container node;
generate a target sub-image including the first target node based on the first image type; wherein the first target node is a null operation node; and
establish a connection between the first target node and any of main operation nodes in the main image, and store a target image identifier corresponding to the target sub-image in attribute information of the target container node.

10. The electronic device of claim 8, wherein the processor is further configured to:
in response to a second generation request for a second target node in the first sub-image, generate a second sub-container node connected to the first sub-container node; wherein the second generation request includes a second image type corresponding to the second target node; and
generate a second sub-image associated with the second sub-container node based on the second image type; wherein the second sub-image includes at least one second operation node;
wherein the processor is configure to acquire a command for image special effect processing based on the main operation node of the main image and the first operation node of the first sub-image by:
acquiring the command for image special effect processing based on the main operation nodes of the main image, the first operation node of the first sub-image, and the second operation node of the second sub-image.

11. The electronic device of claim 8, wherein the processor is configured to generate a first sub-image associated with the first sub-container node based on the first image type by:
acquiring a connection relationship between at least one first operation node corresponding to the first image type and the first operation node;
generating the first sub-image based on the connection relationship between the at least one first operation node and the first operation node; and
storing a first image identifier corresponding to the first sub-image in attribute information of the first sub-container node.

12. The electronic device of claim 8, wherein the processor is configured to acquire a command for image special effect processing based on the main operation node of the main image and the first operation node of the first sub-image by:
acquiring relationship information between main operation nodes based on the main image;
acquiring relationship information between first operation nodes based on the first sub-image; and
generating the command for image special effect processing based on the main operation nodes, the relationship information between the main operation nodes, the first operation nodes and the relationship information between the first operation nodes.

13. The electronic device of claim 8, wherein the processor is further configured to:
in response to a transfer request, acquire a container node to be transferred and a container node to be connected;
disconnect the container node to be transferred from the original container node; and
establish a connection between the container node to be transferred and the container node to be connected.

14. The electronic device of claim 8, wherein the processor is further configured to:
in response to a deletion request, acquire a container node to be deleted;
acquire an identifier of the image to be deleted based on attribute information in the container node to be deleted;
acquire the image to be deleted based on the identifier of the image to be deleted;
delete the container node to be deleted and the image to be deleted; and
in a case that an upper-level container node and a lower-level container node corresponding to the container node to be deleted are acquired, establish a connection between the upper-level container node and the lower-level container node.

15. A non-transitory computer-readable storage medium with instructions stored thereon which, when executed by a processor, causes the processor to:
in response to a first generation request for a first target node in a main image, generate a first sub-container node connected to a main container node associated with the main image; wherein the first generation request includes a first image type corresponding to the first target node, wherein the first target node is an operation node in the main image and the first image type corresponding to the first target node is different from an image type corresponding to the main image, and wherein each of a main container node and a sub-container node refers to a container component that builds an image map structure as a node;

generate a first sub-image associated with the first sub-container node based on the first image type; wherein the first sub-image includes at least one first operation node;

acquire a command for image special effect processing based on a main operation node of the main image and the first operation node of the first sub-image, wherein the operation node in the main image refers to a control node that determines a special effect corresponding to the main image, and wherein the first operation node in the first sub-image refers to a control node that determines a special effect corresponding to the first sub-image; and process and display a target image based on the command for image special effect processing.

16. The medium of claim 15, wherein the instructions further cause the processor to, before the response to a first generation request for a first target node in a main image:

receive a creation request including the first image type, and generating a target container node connected to the main container node;

generate a target sub-image including the first target node based on the first image type; wherein the first target node is a null operation node; and establish a connection between the first target node and any of main operation nodes in the main image, and store a target image identifier corresponding to the target sub-image in attribute information of the target container node.

17. The medium of claim 15, wherein the instructions further cause the processor to:

in response to a second generation request for a second target node in the first sub-image, generate a second sub-container node connected to the first sub-container node; wherein the second generation request includes a second image type corresponding to the second target node; and generate a second sub-image associated with the second sub-container node based on the second image type; wherein the second sub-image includes at least one second operation node;

wherein the processor is configured to acquire a command for image special effect processing based on the main operation node of the main image and the first operation node of the first sub-image by:

acquiring the command for image special effect processing based on the main operation nodes of the main image, the first operation node of the first sub-image, and the second operation node of the second sub-image.

18. The medium of claim 15, wherein the instructions cause the processor to generate a first sub-image associated with the first sub-container node based on the first image type by:

acquiring a connection relationship between at least one first operation node corresponding to the first image type and the first operation node;

generating the first sub-image based on the connection relationship between the at least one first operation node and the first operation node; and storing a first image identifier corresponding to the first sub-image in attribute information of the first sub-container node.

19. The medium of claim 15, wherein the instructions cause the processor to acquire a command for image special effect processing based on the main operation node of the main image and the first operation node of the first sub-image by:

acquiring relationship information between main operation nodes based on the main image;

acquiring relationship information between first operation nodes based on the first sub-image; and generating the command for image special effect processing based on the main operation nodes, the relationship information between the main operation nodes, the first operation nodes and the relationship information between the first operation nodes.

20. The medium of claim 15, wherein the instructions further cause the processor to:

in response to a transfer request, acquire a container node to be transferred and a container node to be connected;

disconnect the container node to be transferred from the original container node; and establish a connection between the container node to be transferred and the container node to be connected.

\* \* \* \* \*